United States Patent
Urs

(10) Patent No.: US 6,408,176 B1
(45) Date of Patent: Jun. 18, 2002

(54) METHOD AND APPARATUS FOR INITIATING A COMMUNICATION IN A COMMUNICATION SYSTEM

(75) Inventor: Kamala D. Urs, Bartlett, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/114,508

(22) Filed: Jul. 13, 1998

(51) Int. Cl.[7] .............................. H04Q 7/20; H04Q 7/38
(52) U.S. Cl. ....................... 455/413; 455/412; 455/403; 455/414; 379/88.13; 379/100.08
(58) Field of Search ................................. 455/413, 412, 455/403, 466, 414, 31.1, 31.2, 38.1, 38.4, 460, 517, 550; 379/88.13, 88.22, 100.08

(56) References Cited

U.S. PATENT DOCUMENTS

| 5,418,835 A | * | 5/1995 | Frohman et al. ............ 455/413 |
| 5,504,805 A | | 4/1996 | Lee ............................... 379/67 |
| 5,943,398 A | * | 8/1999 | Klein et al. ............... 379/88.13 |
| 5,987,317 A | * | 11/1999 | Venturini ...................... 455/412 |
| 6,006,087 A | * | 12/1999 | Amin ........................... 455/413 |
| 6,072,862 A | * | 6/2000 | Srinivasan ............. 379/100.08 |
| 6,085,231 A | * | 7/2000 | Agraharam et al. ...... 379/88.22 |

* cited by examiner

*Primary Examiner*—Lee Nguyen
*Assistant Examiner*—Keith Ferguson
(74) *Attorney, Agent, or Firm*—Daniel C. Crilly; Jeffrey K. Jacobs

(57) ABSTRACT

Caller-related information, such as a telephone number, in a voice mail message intended for a communication unit (102) is extracted from the voice mail message and converted into an alpha-numeric string by a converter device (112). The alpha-numeric string is conveyed by a messaging device (110) to the communication unit and stored in the communication unit. Using the stored caller-related information, a user of the communication unit is able to repeatedly initiate a call to the caller identified by the caller-related information without having to access a voice mail device or enter the caller-related information manually.

15 Claims, 2 Drawing Sheets

METHOD AND APPARATUS FOR INITIATING A COMMUNICATION IN A COMMUNICATION SYSTEM

FIELD OF THE INVENTION

The present invention relates generally to communication systems and, in particular, to initiating a communication using caller-related information obtained from voice mail.

BACKGROUND OF THE INVENTION

Radiotelephone communication systems are prevalent and widely used today. Such systems use fixed network equipment (FNE) connected to the public switched telephone network (PSTN) to provide telephony services to communication units located within the systems. Some radiotelephone systems also include a short message service center (SMSC) as part of the system's FNE, thereby integrating short message service (SMS) with telephony services. In radiotelephone communication systems that have SMS integrated with telephony services, a communication unit user may receive an SMS page and then call the telephone number indicated in a displayed SMS message using the same communication unit. One known technique to allow a user to call the telephone number displayed in the SMS message is for the communication unit user to select an SMS message and to initiate a call to a telephone number contained in that message by pressing a single key on the communication unit. Responsive to the depressed key, the communication unit searches the SMS message for a digit string indicative of the telephone number and automatically initiates a call to the found telephone number. Thus, the user is freed from the inconvenience of having to dial the number manually.

Besides providing SMS, radiotelephone communication systems also provide voice mail services. Users of radiotelephone systems that provide voice mail service often receive voice mail in which a telephone number is given orally for returning the call. In some voice mail systems, such as the voice mail system described in U.S. Pat. No. 5,504,805, the user of the communication unit can request that the voice mail system dial the telephone number given in the voice mail. Such voice mail systems employ known speech recognition technology to convert spoken numbers into digits from which to dial. Accordingly, the user is freed from having to write down or memorize the telephone number while listening to his or her voice mail, both of which are inconvenient options for a user on-the-move.

However, if the user does not want to return the call immediately, the voice mail containing the phone number must remain in the user's mailbox and the user must again access the voice mail system in order to have the telephone number automatically dialed. Consequently, the voice mail must remain stored in the user's voice mailbox until the telephone number is no longer needed for dialing purposes. Keeping voice mail in a mailbox consumes voice mail system resources. In addition, each time the stored number is needed for dialing, the user must access the voice mailbox and sort through the mailbox to find the appropriate voice mail. To access his or her voice mailbox, the user typically must call the voice mail system, enter a mailbox number, and enter a password. Thus, accessing the voice mail system repeatedly is time-consuming and may result in air-time charges for the user. Further, the time taken to sort through and find the appropriate voice mail diminishes the convenience achieved by automatic dialing.

Therefore, a need exists for an apparatus and method for initiating a communication in a communication system that provides for automatic dialing of stored voice mail telephone numbers, but that does not require a user to access the voice mail system repeatedly to call the same number.

DESCRIPTION OF A PREFERRED EMBODIMENT

Generally, the present invention provides an apparatus and method for initiating a communication in a communication system that includes a communication system infrastructure and a communication unit. The communication system infrastructure receives voice mail intended for a user of the communication unit. The voice mail includes caller-related information (e.g., a telephone number) that enables the communication unit to initiate a communication. The communication system infrastructure extracts the caller-related information from the voice mail message (e.g., responsive to a request for such information from the communication unit) and transmits the caller-related information to the communication unit (e.g., in the form of an alpha-numeric string). The communication unit stores the caller-related information. Upon receiving a request from a user of the communication unit to initiate a communication using the stored caller-related information, the communication unit initiates the communication using the stored caller-related information. By initiating a communication using stored caller-related information in this manner, a communication unit user can return a voice mail call, possibly multiple times, without having to write the telephone number down, reaccess the voice mail, or dial the number manually. Thus, the present invention allows the user of a communication unit to conveniently initiate a communication using information obtained from a voice mail message.

Figure 1:
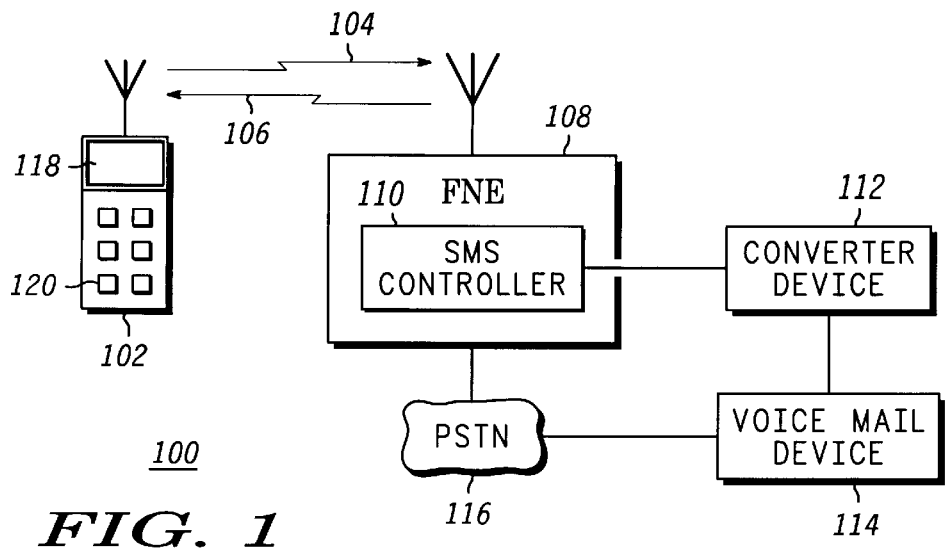
FIG. 1 illustrates a block diagram depiction of a communication system in accordance with a preferred embodiment of the present invention.
Figure 2:
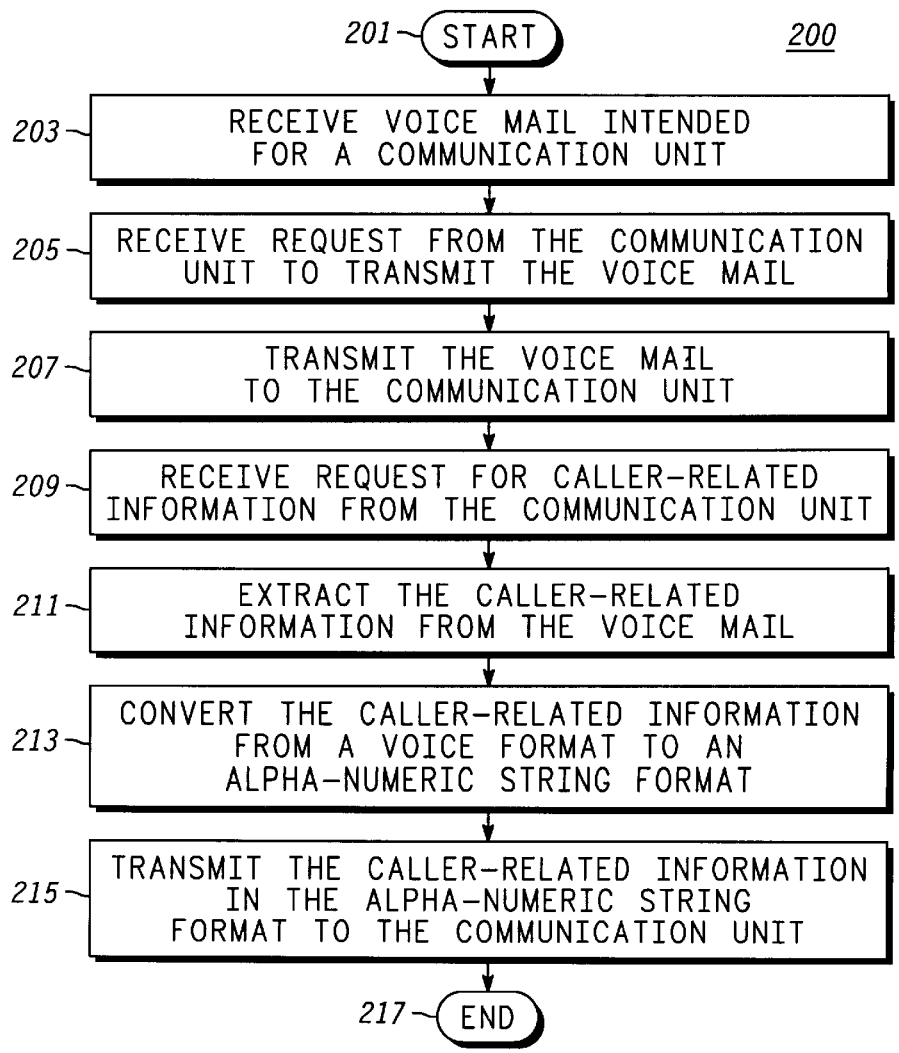
FIG. 2 illustrates a logic flow diagram of steps executed by a communication system infrastructure to provide a communication unit with caller-related information in accordance with a preferred embodiment of the present invention.
Figure 3:
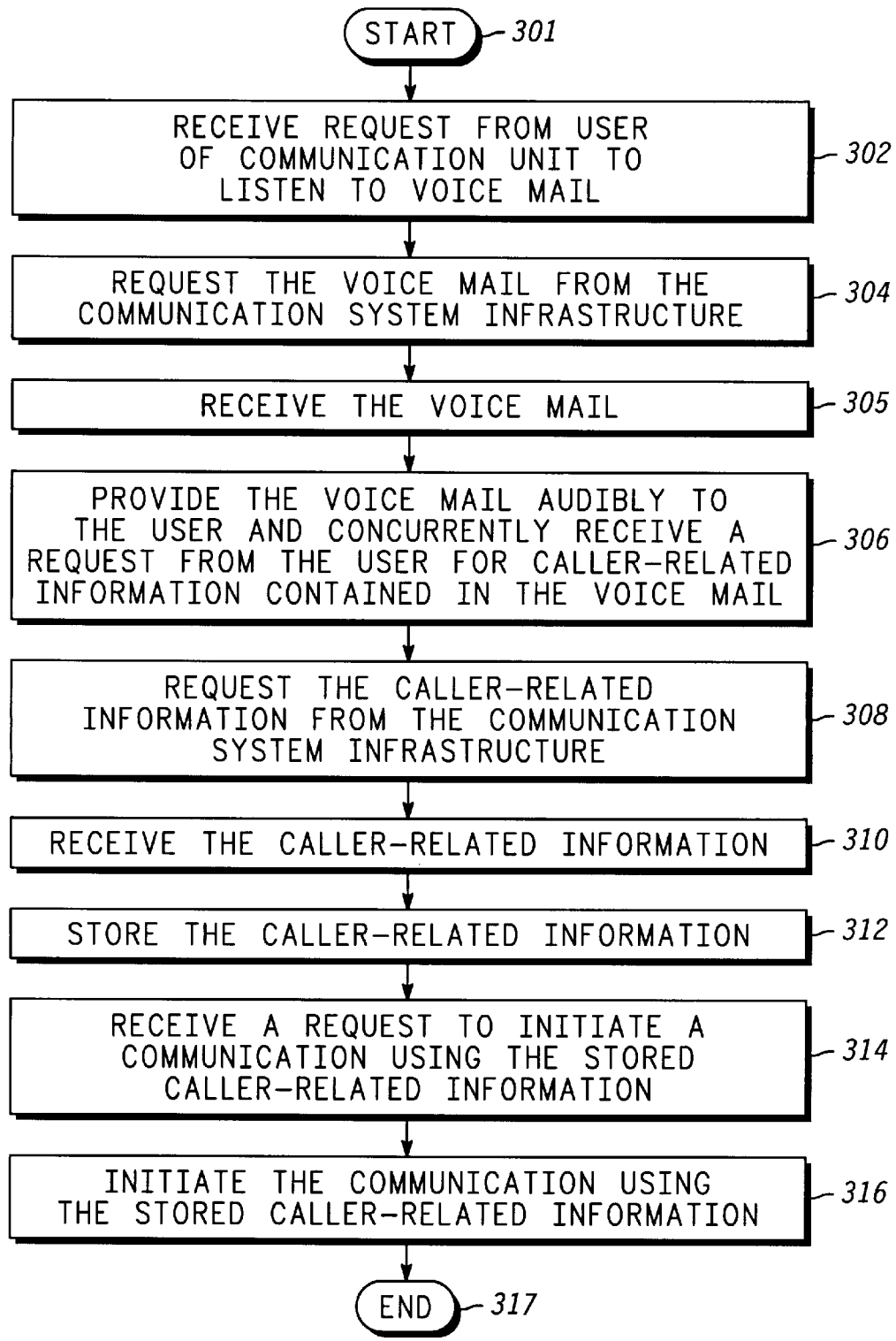
FIG. 3 illustrates a logic flow diagram of steps executed by a communication unit to initiate a communication in accordance with a preferred embodiment of the present invention.

The present invention can be more fully understood with reference to FIGS. 1–3. FIG. 1 illustrates a block diagram depiction of a communication system 100 in accordance with a preferred embodiment of the present invention. The communication system 100 preferably includes a communication unit 102, fixed network equipment 108, a converter device 112, a voice mail device 114, and a public switched telephone network 116. In a preferred embodiment, the communication system 100 comprises an "iDEN" communication system that is commercially available from Motorola, Inc. of Schaumburg, Ill. Accordingly, the communication unit 102 preferably comprises an "iDEN" radiotelephone and the FNE 108 preferably comprises "iDEN" infrastructure components. In addition, the communication unit 102 preferably includes a keypad 120 and a display 118, and the FNE 108 preferably includes an SMS controller 110, such as the Telepath Short Message Service Center that is commercially available from Aldiscon, Inc. of Dallas, Tex. The voice mail device 114 preferably comprises a Glenayre Voice Mail System commercially available from Glenayre Electronics, Inc. of Charlotte, N.C. The converter device 112 comprises well-known speech recognition and speech-to-text software such as the "IBM ViaVoice" speech recognition engine that is commercially available from International Business Machines, Inc. The FNE 108, the converter device 112, and the voice mail device 114 may be collectively referred to as the communication system infrastructure.

Operation of the communication system 100 occurs substantially as follows in accordance with a preferred embodiment of the present invention. A PSTN user or a user of another communication unit (not shown) attempts to communicate with the user of the communication unit 102 using known wireless telephony procedures. When the communication unit 102 is inaccessible (e.g., because the communication unit 102 is powered off or is currently engaged in another call) and the communication unit 102 has voice mail service, the caller leaves a voice mail message at the voice mail device 114 for the user of the communication unit 102. The voice mail device 114 then stores the voice mail message intended for the communication unit 102. The voice mail message includes caller-related information that enables the communication unit 102 to initiate a future communication. Caller-related information includes a telephone number, a communication unit identifier, a talkgroup identifier, an alias, or any other information a user of the communication unit 102 could use to initiate a communication in response to the voice mail message.

In the preferred embodiment, when the user of the communication unit 102 is ready to retrieve caller-related information from his or her voice mail, the communication unit 102 transmits a request for the caller-related information contained in the voice mail to the FNE 108 via a radio communication resource 104. The FNE 108, which provides communication services to the communication unit 102, forwards the request to the converter device 112. Upon receiving the request, the converter device 112 extracts the caller-related information from the voice mail stored in the voice mail device 114 and converts the caller-related information from a voice format to an alpha-numeric string format in accordance with known speech-to-text conversion techniques. The converter device 112 then conveys the caller-related information in the alpha-numeric string format to the communication unit 102 via the FNE 108.

In the preferred embodiment, the FNE 108 includes a messaging device, such as the SMS controller 110, that delivers alpha-numeric messages to the communication unit 102. Thus, in the preferred embodiment, the converter device 112 conveys the caller-related information to the SMS controller 110, and the SMS controller 110 transmits the caller-related information to the communication unit 102 via a radio communication resource 106 supported by the FNE 108 in accordance with known techniques.

Upon receiving the caller-related information, the communication unit 102 stores the caller-related information. Because the caller related information is resident in the communication unit 102, the user of the communication unit 102 can initiate a communication using the stored caller-related information at his or her convenience. Preferably, the user of the communication unit 102 initiates such a communication by selecting the caller-related information for viewing on the display 118 of the communication unit 102 and then pressing a key, button, or combination of keys and buttons on the keypad 120 of the communication unit 102. For example, the user might press the communication unit's "SEND" button while reading an SMS message containing the particular caller-related information desired for initiating the return call.

In an alternate embodiment, the converter device 112 may extract and convert the caller-related information in real-time as a voice mail message is received by the voice mail device 114. In this case, the converter device 112 conveys the caller-related information in alpha-numeric string format to the communication unit 102 without receiving any request for such information. The communication unit's receipt of the unrequested caller-related information would serve to notify the user of the communication unit 102 of voice mail received by the voice mail device 114 and immediately enable the user to initiate a communication using the caller-related information. Alternatively, the converter device 112 may extract and convert the caller-related information in real-time as a voice mail message is received, but then wait until a request is received for the caller-related information before conveying the caller-related information to the communication unit 102.

By initiating a communication using stored caller-related information as described above, a user of a communication unit can return a voice mail call, possibly multiple times, without having to write the telephone number down, memorize the telephone number, or dial the telephone number manually. In the prior art, the user of the communication unit, to achieve the benefits listed above, needs to reaccess the appropriate voice mail message each time he or she wants to initiate a communication using the stored caller-related information. Reaccessing voice mail requires making an extra call to the voice mail server. The extra call is an inconvenience to the user of a communication unit because it requires more of the user's time. The user must make a call in order to initiate another call. The extra call is also inconvenient because of the key presses the user typically needs to perform. Such additional key pressing is especially inconvenient and distracting when the user is involved in another task, such as driving a car. The present invention enables the user of a communication unit to initiate a communication using caller-related information contained in a voice mail message without reaccessing a voice mail server. Thus, the present invention provides the benefits of automatic callback techniques without the inconvenience of such prior art techniques.

FIG. 2 illustrates a logic flow diagram 200 of steps executed by a communication system infrastructure to provide a communication unit with caller-related information in accordance with a preferred embodiment of the present invention. The logic flow begins (201) when the communication system infrastructure receives (203) and stores voice mail intended for a communication unit. At some later time, the communication system infrastructure receives (205) a request from the communication unit to transmit the voice mail to the communication unit. In response to the request, the infrastructure transmits (207) the voice mail to the communication unit. Then, either during transmission of the voice mail or subsequent to transmission of the voice mail, the communication system infrastructure receives (209) a request from the communication unit to transmit caller-related information contained in the voice mail. Responsive to the request, the communication system infrastructure, using speech recognition techniques, extracts (211) the caller-related information from the voice mail and converts (213) the caller-related information from a voice format into an alpha-numeric string format. The communication system infrastructure then transmits (215) the caller-related information in the alpha-numeric string format to the communication unit, and the logic flow ends (217).

In an alternate embodiment as discussed above with regard to FIG. 1, the communication system infrastructure might, upon receiving voice mail, extract the caller-related information, convert the caller-related information into an alpha-numeric string format, and sent the caller-related information to the communication unit automatically. That is, the caller-related information could be sent without a specific request for the caller-related information from the communication unit. Alternatively, the communication unit might send a single request to the infrastructure enabling or disabling the automatic sending of the caller-related information.

FIG. 3 illustrates a logic flow diagram 300 of steps executed by a communication unit to initiate a communication in accordance with a preferred embodiment of the present invention. The logic flow begins (301) when the communication unit receives (302) a request from a user of the communication unit to listen to his or her voice mail. It is assumed for the purposes of this discussion that the communication unit has already obtained access, in accordance with known techniques, to the communication system infrastructure and the appropriate voice mail mailbox therein before the communication unit receives the request.

In response to the user request, the communication unit requests (304) the particular voice mail from the communication system infrastructure. Responsive to the request, the communication unit receives (305) the voice mail and audibly provides (306) or plays the voice mail to the user.

While playing the voice mail, the communication unit receives (306) a request from the user for caller-related information contained in the voice mail. Responsive to the user request, the communication unit requests (308) the caller-related information from the communication system infrastructure. The communication unit then receives (310) and stores (312) the caller-related information for the user.

The execution of the steps contained in blocks 302 through 312 preferably occurs while the user is involved in a session with a voice mail server of the communication system infrastructure. Once the communication unit receives and stores the caller-related information, the session with the voice mail server ends. In an alternate embodiment, the infrastructure might send the caller-related information automatically. In such an embodiment, the receiving and storing of caller-related information would not necessarily require the communication unit to have any session with the voice mail server.

Once the communication unit receives (310) and stores (312) the caller-related information, the user of the communication unit can now, at his or her convenience, request to initiate a communication using the stored caller-related information. To initiate a communication in accordance with a preferred embodiment of the present invention, the communication unit receives (314) a request to initiate a communication using the stored caller-related information. In the preferred embodiment, the communication unit receives the request to initiate the communication by detecting that the user pressed a key, button, or combination of keys and buttons on the communication unit subsequent to selecting particular caller-related information to view on a display of the communication unit. For example, the user might press the communication unit's "SEND" button while reading an SMS message containing the particular caller-related information. The communication unit may have stored multiple SMS messages, each with different caller-related information. In such a case, the user need only read the appropriate SMS message and hit the SEND button to initiate a call.

In response to the request, the communication unit initiates (316) the communication using the stored caller-related information, and the logic flow ends (317). Because the communication unit stores the caller-related information, the user may repeatedly initiate communications using the caller-related information. Accordingly, unlimited communications may be initiated to the same caller without having to access the voice mail server in the communication system infrastructure.

The present invention encompasses an apparatus and method for initiating a communication in a communication system. By sending caller-related information contained in a voice mail message to a communication unit and storing the caller-related information in the communication unit, a user of the communication unit is no longer forced to access a voice mail device each time a communication is to be initiated using the caller-related information. In addition, storing of the caller-related information in the communication unit eliminates the need for the user of the communication unit to write down the caller-related information (e.g., telephone number) or dial the telephone number manually, thereby minimizing user distractions (e.g., when the user is driving a car) when the user simply wants to respond to a voice mail message.

While the present invention has been particularly shown and described with reference to particular embodiments thereof, it will be understood by those skilled in the art that various changes in form and details may be made therein without departing from the spirit and scope of the present invention.

I claim:

1. A communication system, comprising:
fixed network equipment that provides communication services to a communication unit located within the communication system;
a voice mail device, coupled to the fixed network equipment, that receives voice mail intended for the communication unit; and
a converter device, coupled to the fixed network equipment and the voice mail device, that extracts caller-related information from the voice mail, converts the caller-related information from a voice format to an alpha-numeric string format, and conveys the caller-related information in the alpha-numeric string format to the communication unit via the fixed network equipment, wherein, after the converter device conveys the caller-related information, the fixed network equipment receives a request from the communication unit to use the caller-related information to initiate a communication between the communication unit and at least one target device, wherein the caller-related information identifies the at least one target device, wherein the voice mail device further stores the voice mail to produce stored voice mail, and wherein the converter device extracts the caller-related information from the stored voice mail.

2. The communication system of claim 1, wherein the fixed network equipment includes a messaging device that delivers messages to the communication unit, and wherein the converter device conveys the caller-related information to the communication unit via the messaging device.

3. The communication system of claim 2, wherein the messaging device comprises a short message service controller.

4. The communication system of claim 1, wherein the caller-related information comprises a telephone number.

5. The communication system of claim 1, wherein the caller-related information comprises a talkgroup identifier.

6. The communication system of claim 1, wherein the caller-related information comprises a communication unit identifier.

7. The communication system of claim 1, wherein the caller-related information comprises an alias.

8. In a communication system that includes an infrastructure and a communication unit, a method for the infrastructure to provide the communication unit with caller-related information that enables the communication unit to initiate a communication, the method comprising the steps of:

receiving voice mail intended for the communication unit;

storing the voice mail to produce stored voice mail;

extracting the caller-related information from the stored voice mail;

converting the caller-related information from a voice format into an alpha-numeric string format;

transmitting the caller-related information in the alpha-numeric string format to the communication unit; and receiving a request from the communication unit to use the caller-related information to initiate a communication between the communication unit and at least one target device, wherein the caller-related information identifies the at least one target device.

9. The method of claim 8, further comprising the steps of: receiving a request from the communication unit to transmit the voice mail to the communication unit; and transmitting the voice mail to the communication unit responsive to the request.

10. The method of claim 8, further comprising the step of receiving a request from the communication unit to transmit the caller-related information to the communication unit prior to the step of transmitting the caller-related information.

11. A method for a communication unit to initiate a communication, the method comprising the steps of:

requesting from a communication system infrastructure caller-related information contained in a voice mail message, the caller-related information being in a voice format and being information needed to initiate the communication in response to the voice mail message;

receiving the caller-related information in an alpha-numeric string format resulting from a voice-to-alpha-numeric-string-format conversion after extraction from stored voice mail;

storing the caller-related information to produce stored caller-related information;

receiving a request from a user of the communication unit to use the stored caller-related information to initiate a communication between the communication unit and at least one target device, wherein the stored caller-related information identifies the at least one target device; and initiating the communication using the stored caller-related information.

12. The method of claim 11, further comprising the steps of:

receiving a request from the user of the communication unit to listen to the voice mail message;

requesting from the communication system infrastructure the voice mail message; and providing the voice mail message audibly to the user of the communication unit.

13. The method of claim 12, further comprising the steps of: receiving a request from the user of the communication unit for the caller-related information concurrent with the step of providing the voice mail message audibly to the user of the communication unit.

14. The method of claim 11, further comprising the step of receiving a request from the user of the communication unit for the caller-related information prior to requesting from the communication system infrastructure the caller-related information.

15. The method of claim 11, wherein the step of receiving a request from a user of the communication unit to initiate the communication comprises the steps of:

displaying the stored caller-related information to the user of the communication unit; and responsive to displaying, detecting that the user pressed at least one key on the communication unit.

* * * * *